(12) United States Patent
Simon

(10) Patent No.: US 9,233,868 B2
(45) Date of Patent: Jan. 12, 2016

(54) SYSTEM AND METHOD FOR CONTROLLING PUSHER PARAMETERS TO ADJUST THE PLACEMENT OF GLASS CONTAINERS ON THE CONVEYOR

(75) Inventor: Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 982 days.

(21) Appl. No.: 13/365,639

(22) Filed: Feb. 3, 2012

(65) Prior Publication Data

US 2012/0211331 A1     Aug. 23, 2012

Related U.S. Application Data

(60) Provisional application No. 61/445,603, filed on Feb. 23, 2011.

(51) Int. Cl.
| | |
|---|---|
| *B65G 47/82* | (2006.01) |
| *B65G 47/22* | (2006.01) |
| *B65G 47/32* | (2006.01) |
| *B65G 47/74* | (2006.01) |
| *C03B 9/453* | (2006.01) |
| *C03B 9/41* | (2006.01) |
| *G05B 13/04* | (2006.01) |

(52) U.S. Cl.
CPC . *C03B 9/453* (2013.01); *C03B 9/41* (2013.01); *G05B 13/042* (2013.01); *G05B 13/048* (2013.01); *B65G 47/82* (2013.01); *G05B 2219/42036* (2013.01); *G05B 2219/42058* (2013.01); *G05B 2219/42307* (2013.01)

(58) Field of Classification Search
None
See application file for complete search history.

(56) References Cited

U.S. PATENT DOCUMENTS

| | | | | |
|---|---|---|---|---|
| 4,694,158 | A | | 9/1987 | Leser |
| 5,797,635 | A | * | 8/1998 | Willems ............... E05C 19/105 292/111 |
| 5,979,635 | A | * | 11/1999 | Calhoun ....................... 198/456 |
| 7,054,710 | B2 | * | 5/2006 | Hartmann ................. C03B 9/41 65/160 |
| 7,098,440 | B2 | | 8/2006 | Bathelet et al. |
| 7,346,402 | B1 | | 3/2008 | Stahl |
| 7,660,642 | B1 | | 2/2010 | Tuszynski |
| 2011/0141264 | A1 | | 6/2011 | Holtkamp et al. |
| 2011/0141265 | A1 | * | 6/2011 | Holtkamp ............. G01J 5/0003 348/86 |

FOREIGN PATENT DOCUMENTS

| | | |
|---|---|---|
| EP | 0425114 | 5/1991 |
| EP | 0583106 | 2/1994 |
| EP | 1873091 | 1/2008 |
| EP | 2336740 | 6/2011 |
| GB | 2199319 | 7/1988 |

OTHER PUBLICATIONS

European Search Report for European Patent Application No. 12155437.2 dated Aug. 19, 2014, 11 pages.

* cited by examiner

*Primary Examiner* — Kavel Singh
(74) *Attorney, Agent, or Firm* — Reinhart Boerner Van Deuren P.C.

(57) ABSTRACT

A system and method for automatically adjusting the motion and timing of pusher mechanisms in an I.S. machine to maintain desired spacing and lateral alignment of glass containers on a conveyor taking them from the I.S. machine where they are molded. The measured glass container placement and the desired glass container placement are used to vary the operation of the pusher mechanisms in a manner tending to obtain the desired placement.

23 Claims, 4 Drawing Sheets

SYSTEM AND METHOD FOR CONTROLLING PUSHER PARAMETERS TO ADJUST THE PLACEMENT OF GLASS CONTAINERS ON THE CONVEYOR

IDENTIFICATION OF RELATED PATENT APPLICATIONS

This patent application claims priority of U.S. Provisional Patent Application No. 61/445,603, which is entitled "System and Method for Controlling Pusher Parameters to Adjust the Placement of Glass Containers on the Conveyor Belt," and which was filed on Feb. 23, 2011, which patent application is hereby incorporated herein by reference in its entirety.

BACKGROUND OF THE INVENTION

Field of the Invention

The present invention relates generally to operation of an I.S. machine and more particularly to improving process yield and quality while reducing dependence on operator skill by automatically adjusting the motion and timing of pusher mechanisms in an I.S. machine to maintain desired spacing and lateral alignment of glass containers on a conveyor taking them from the I.S. machine where they are molded.

A system and method for monitoring hot glass containers at the hot end as they stream from an I.S. machine manufacturing them is disclosed in European Published Patent Application No. EP 2 336 740 A1, published on Jun. 22, 2011, entitled "Method and System for Monitoring and Controlling a Glass Container Forming Process," in U.S. Patent Application Publication No. US 2011-0141264 A1, published on Jun. 16, 2011, entitled "Method and System for Monitoring and Controlling a Glass Container Forming Process," and in U.S. Patent Application Publication No. US 2011/0141265 A1, filed on Dec. 8, 2010, entitled "System and Method for Monitoring Hot Glass Containers to Enhance Their Quality and Control the Forming Process," all three of which are assigned to the assignee of the present patent application, and all three of which are hereby incorporated herein by reference in their entirety.

While these systems and methods enable the quality of hot glass containers manufactured by an I.S. machine to be monitored, it would be beneficial to use the large amount of information available on the characteristics of the hot glass containers provided by these systems and methods to further enhance the quality of the hot glass containers being manufactured by the I.S. machine. In this regard, it would be beneficial to use some of the information regarding the characteristics of the hot glass containers provided by these systems and methods to automatically control the operation of the I.S. machine to further enhance the quality and the yield of the hot glass containers being produced.

In general, automatic adjustment of the machine to control placement of the hot glass containers on the conveyor taking them from the I.S. machine based upon the information available on the characteristics of the hot glass containers has not been accomplished in the past, and would thus represent a new development. Fundamentally, the best placement of the hot glass containers on the conveyor is along a longitudinal axis of the conveyor (typically the centerline of the conveyor) such that the hot glass containers are evenly spaced apart on the conveyor.

I.S. machines have a number of identical sections which produce hot glass containers from discrete gobs of glass, with each section making from two to four glass containers at a time. The glass containers formed in each section are deposited on a deadplate where they are cooled for a short period of time, and they are then displaced by a pusher mechanism for that section through a ninety-degree arc from the deadplate onto a transversely moving conveyor. Each pusher mechanism has a finger assembly having a pocket for contacting each glass container from a section (which glass containers are arrayed on the deadplate in a line orthogonal to the conveyor). The finger assembly is secured to a pusher arm operated by a pusher drive assembly so that the finger assembly can be rotated through a ninety-degree arc to simultaneously sweep the glass containers on a section deadplate onto the conveyer.

The operating mechanisms for pusher mechanisms have become more sophisticated and thus capable of increased precision of operation (see U.S. Pat. No. 7,426,990, to Kammonen, and U.S. Pat. No. 7,930,902, to Simon et al., both of which are assigned to the assignee of the present patent application, and both of which are hereby incorporated herein in their entirety). The timing of the operation of the pusher mechanism may be varied to adjust the longitudinal position of hot glass containers placed onto the conveyor, and the final angular position of the pusher arm as it places the hot glass containers onto the conveyor (as well as the angular position of the finger assembly with respect to the pusher arm) may be varied to adjust the lateral positions of the hot glass containers placed onto the conveyor. However, the adjustment of the pusher mechanisms has to date been performed by an operator rather than automatically based upon information available from analyzing the images of the hot glass containers.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, a closed loop control system is used to automatically adjust the pusher parameters utilizing calculated longitudinal measurements of the positions of the glass containers along the conveyor and the calculated lateral measurements of the positions of the glass containers across the conveyer provided by a container position measurement system such as the above-incorporated by reference U.S. Patent Application Publication No. US 2011-0141264 A1 and U.S. Patent Application Publication No. US 2011/0141265 A1, or, alternately, any other system providing X and Y positions of the glass containers on the conveyor.

In a system embodiment, a pusher mechanism is used to move glass containers from a deadplate to the conveyor, a glass container placement measurement system is used to provide a measured glass container placement signal indicative of the actual locations of glass containers moved onto the conveyer by the pusher mechanism, apparatus is used to compare the measured glass container placement signal with a desired glass container placement signal and generate a glass container placement error signal, and a control system is provided that uses the glass container placement error signal to provide modified pusher parameters to vary the operation of the pusher mechanism in a manner that will cause the glass container placement error signal to be diminished.

In a method embodiment, a desired glass container placement signal and a measured glass container placement signal indicative of the actual locations of glass containers moved onto the conveyer by the pusher mechanism are provided, the measured glass container placement signal is compared with a desired glass container placement signal to generate a glass container placement error signal, and the glass container placement error signal is used to provide modified pusher parameters to vary the operation of the pusher mechanism in a manner that will cause the glass container placement error signal to be diminished.

DESCRIPTION OF THE DRAWINGS

These and other advantages of the present invention are best understood with reference to the drawings, in which.

DETAILED DESCRIPTION OF THE EXEMPLARY EMBODIMENT

Figure 1:
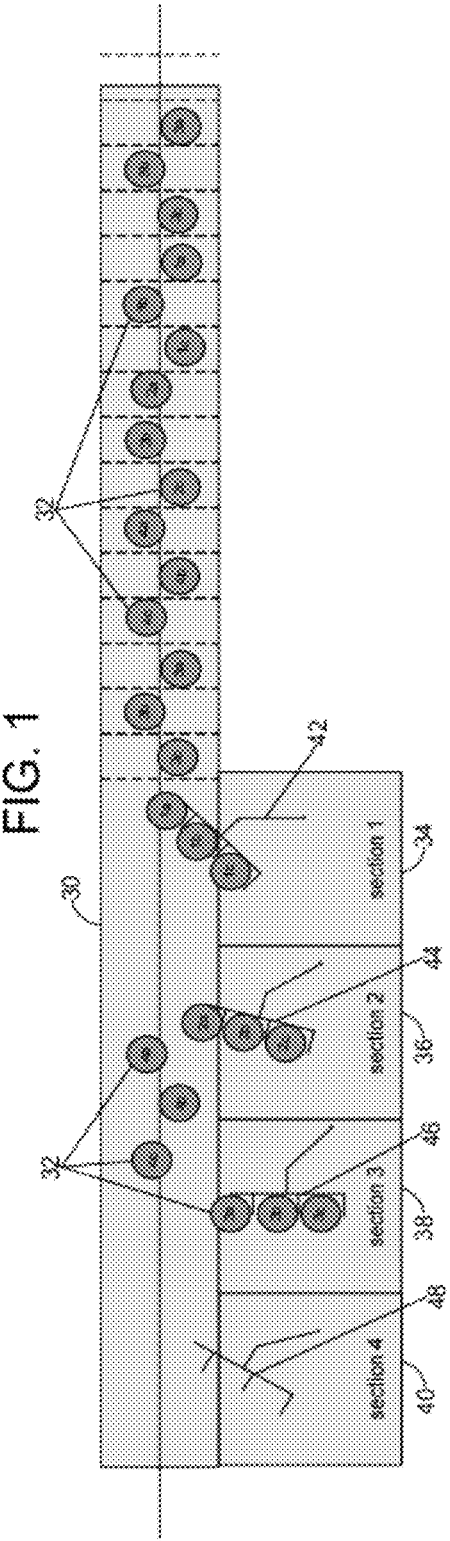
FIG. 1 is a schematic depiction from the top of hot glass containers from four sections of an I.S. machine being moved from deadplates for each of the four sections onto a conveyor by pusher mechanisms.

A schematic representation of a conveyor 30 onto which a plurality of hot glass containers 32 are loaded as they leave four sections of an I.S. machine (a triple gob, four section I.S. machine is used as an example, with the present invention being applicable to I.S. machines having any number of gobs and sections) is shown in FIG. 1. The four sections, which are not shown, respectively terminate in four deadplates 34, 36, 38, and 40 onto which newly formed hot glass containers 32 are deposited in lines orthogonal to the longitudinal direction of the conveyor 30 (as best shown by the glass containers 32 on the deadplate 38). Since the I.S. machine used in the example of FIG. 1 is a three-gob machine, three hot glass containers 32 are deposited onto each of the deadplates 34, 36, 38, and 40.

As shown in FIG. 1, the glass containers 32 from each of the four sections are pushed off of the deadplates 34, 36, 38, and 40 and onto the conveyor 30 by four pushers 42, 44, 46, and 48, respectively, which are schematically illustrated in FIG. 1. The section and cavity that each container on the conveyor originated from are labeled. Ideally the glass containers 32 would be equally spaced along the conveyor 30 and would all be placed laterally on the centerline of the conveyor 30. As indicated in FIG. 1, in an exaggerated fashion, the actual glass container 32 placements may not be in the ideal locations.

Various programmable adjustments can be made to the pushers 42, 44, 46, and 48 to more closely achieve the ideal placement of the glass containers 32. These include modifying the parameters defining the motion profile (position versus time), pocket air timing, and start of push timing. For multi axis, servo pushers (see the above-incorporated by reference U.S. Pat. No. 7,426,990 and U.S. Pat. No. 7,930,902), the glass container 32 placement becomes a function of both of the motion profiles of the individual axes, and their relative start timings. These adjustments will be referred to herein collectively as the "pusher parameters." Of particular relevance is the case where a two axis pusher, such as the device shown in the above-incorporated by reference U.S. Pat. No. 7,426,990, is used and the adjustable parameters are, for example, those defined in the above-incorporated by reference U.S. Pat. No. 7,930,902. The two axis pusher allows both the angular position of the pusher arm as it places the hot glass containers onto the conveyor and also the angular position of the finger assembly with respect to the pusher arm to be varied, thereby allowing highly accurate adjustment of the lateral positions of the hot glass containers as they are placed onto the conveyor. It also allows the longitudinal position of the group of hot glass containers placed onto the conveyor from a given section to be adjusted by varying the timing of the operation of the pusher mechanism.

The pusher parameters will be automatically adjusted by the closed loop conveyor control system of the present invention utilizing the calculated longitudinal measurements of the positions of the glass containers 32 along the conveyor 30 (x) locations and the calculated lateral measurements of the positions of the glass containers 32 across the conveyer 30 (y) locations of the glass containers 32 that are provided by a container position measurement system such as the above-incorporated by reference U.S. Patent Application Publication No. US 2011-0141264 A1 and U.S. Patent Application Publication No. US 2011/0141265 A1.

Typically, there is a complicated relationship between the values of the pusher parameters and the corresponding placement of the glass containers 32 on the conveyor 30. In general, adjustment of any one pusher parameter will result in some amount of variations in the x and y locations of each of the glass containers 32 coming from that section. (The number of containers per section, i.e. the number of cavities, can vary between one and four for today's machines.) Furthermore the amount of variation for each cavity may differ, that is, the effect of the pusher parameters is highly coupled.

Thus, it is not generally possible to assign an individual parameter to control the x or y location of an individual container. Furthermore, due to the nature of the underlying mechanism kinematics and glass container 32 pushing dynamics, it may not be possible to achieve perfect placement even using all of the available parameters. The general challenge, faced by any closed loop container placement control system, is to cope with the coupled and constrained nature of the underlying process and still provide a reasonable approximation to ideal placement. This is addressed by the present invention in a manner that utilizes the hot glass container quality analytical system described in the above-incorporated by reference U.S. Patent Application Publication No. US 2011-0141264 A1 and U.S. Patent Application Publication No. US 2011/0141265 A1, which is capable of providing as an output a measured glass container placement signal indicative of the actual locations of glass containers moved onto the conveyor 30 by the pushers 42, 44, 46, and 48 (shown in FIG. 1).

Figure 2:
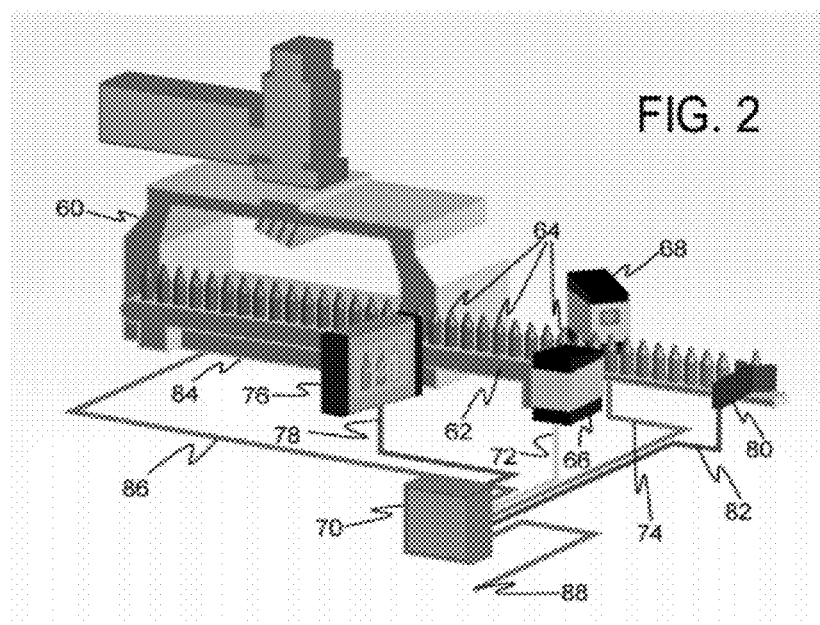
FIG. 2 is a simplified view of a hot glass container quality analytical system according to the present invention showing the essential components thereof as installed in a typical glass container manufacturing line.

Referring next to FIG. 2, the major components of the hot glass container quality analytical system which can provide such a measured glass container placement signal indicative of the actual locations of glass containers is illustrated in schematic fashion. An I.S. machine 60 has a conveyor 62 extending therefrom on which a stream of hot glass containers 64 are conveyed away from the I.S. machine 60. Two camera modules 66 and 68 are located in positions to monitor the hot glass containers 64 as they pass by the two camera modules 66 and 68 on the conveyor 62. In a preferred embodiment, the camera modules 66 and 68 each include a SWIR (short wave infrared) imaging acquisition device that scans a vertical line which will be used to acquire images of the hot glass containers 64 as they pass by on the conveyor 62. As the hot glass containers 64 pass by, a multiplicity of vertical lines will be scanned that will together form electronic images of the hot glass containers 64.

The first camera module 66 is located with an axis orthogonal to the longitudinal axis of the conveyor 62 on which the hot glass containers 64 travel after leaving the I.S. machine 60, with the first camera module 66 being oriented toward the hot glass containers 64 passing by on the conveyor 62. The second camera module 68 is located with an axis at a predefined angle with respect to the longitudinal axis of the conveyor 62 and on the opposite side of the conveyor 62, with the second camera module 68 also being oriented toward the hot glass containers 64 passing by on the conveyor 62. The camera modules 66 and 68 are preferably located such that their respective axes intersect at a point at the middle of the lateral axis of the conveyor 62, which is at the centerline of the conveyor 62 (if they are not so located, appropriate mathematical compensation may be made).

The camera modules 66 and 68 are connected to a control unit 70 that may be used to calculate and provide the measured glass container placement signal that is indicative of the actual locations of hot glass containers 64 moved onto the conveyor 62 by the pushers 42, 44, 46, and 48 (shown in FIG. 1). The camera module 66 is connected to the control unit 70 via a connection 72, and the camera module 68 is connected to the control unit 70 via a connection 74. The connections 70 and 72 may be network connections such as TCPIP network connections.

A user interface module 76 is connected to the control unit 70 via a connection 78, which may be a network connection such as a TCPIP network connection. The user interface module 76 may be used both to display information generated by the hot glass container quality analytical system (including the actual locations of hot glass containers 64 on the conveyor 62) as well as to set up the hot glass container quality analytical system. Further, the information generated by the hot glass container quality analytical system and displayed on the user interface module 76 may be used to provide the measured glass container placement signal indicative of the actual locations of glass containers placed on the conveyor 62 by the pushers 42, 44, 46, and 48 (shown in FIG. 1).

Based upon the information generated by the hot glass container quality analytical system of the present invention, the hot glass containers 64 that are determined to be of unacceptable quality by the hot glass container quality analytical system are rejected and removed from the stream of the hot glass containers 64 on the conveyor 62. A glass container reject mechanism 80 that performs this function is operated by the control unit 70 via a connection 82, which may be a simple trigger signal such as a twenty-four Volt pulse.

The hot glass container quality analytical system of the present invention is provided with timing pulses by an I.S. machine control unit 84 via a connection 86. These timing pulses are used by the hot glass container quality analytical system to define from which section and which mold each of the hot glass containers 64 on the conveyor 62 originates. In this way, the hot glass container quality analytical system of the present invention can display this information to an operator accessing the user interface module 76. The present invention contemplates that the information generated by this system may be used to automatically control the operation of the pushers 42, 44, 46, and 48 (shown in FIG. 1) through the I.S. machine control unit 84 via the connection 86.

Figure 8:
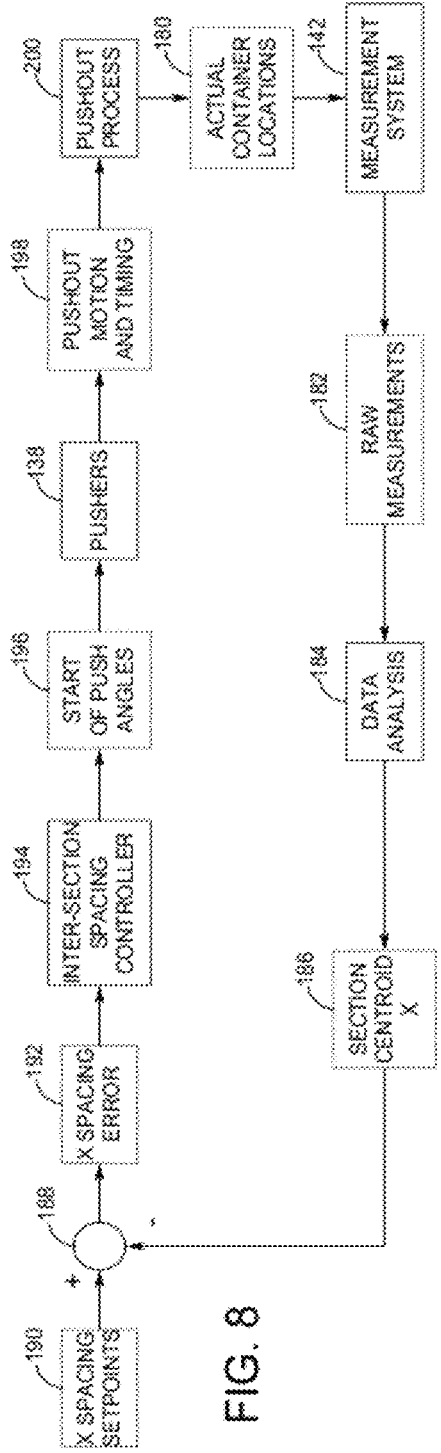
FIG. 8 is a functional schematic depiction of a fourth embodiment of the present invention which controls only the sectional spacing of glass containers.

It may be noted that the control unit 70 of the hot glass container quality analytical system of the present invention is depicted as having another connection 88, the distal end of which is not shown as being connected in FIG. 8. This connection 88, which may also be a network connection such as a TCPIP network connection, may be used to connect additional remote control units (not shown in FIG. 8) which may be located, for example, in a control room at the glass container manufacturing plant at which the I.S. machine 60 is located, in an engineer's office either at that manufacturing plant or at another remote location, and/or in another remote location such as, for example, the hot glass container quality analytical system provider's facility to remotely monitor and troubleshoot the system at customer locations.

Figure 3:
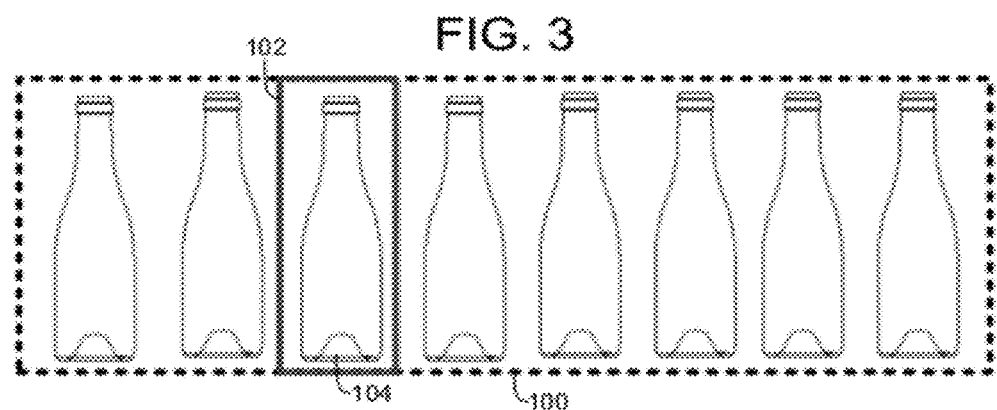
FIG. 3 is a schematic drawing of a plurality of hot glass containers in a continuing digital "filmstrip" of images showing an image of a single hot glass container to be extracted from the "filmstrip" of images.

Referring next to FIG. 3, the line scan input from the cameras has the images extracted module to produce digital "filmstrips" of images 100 of the hot glass containers. This provides a frame of each hot glass container, such as the single hot glass container image frame 102 in which the single hot glass container image 104 is located. It will be appreciated that the single hot glass container image 104 consists of a selected number of horizontal lines and a selected number of vertical lines that are respectively determined by the vertical resolution of one of the infrared cameras and the scan frequency. Once the single hot glass container image 104 has been extracted from each of the infrared cameras, they may be analyzed.

Figure 4:
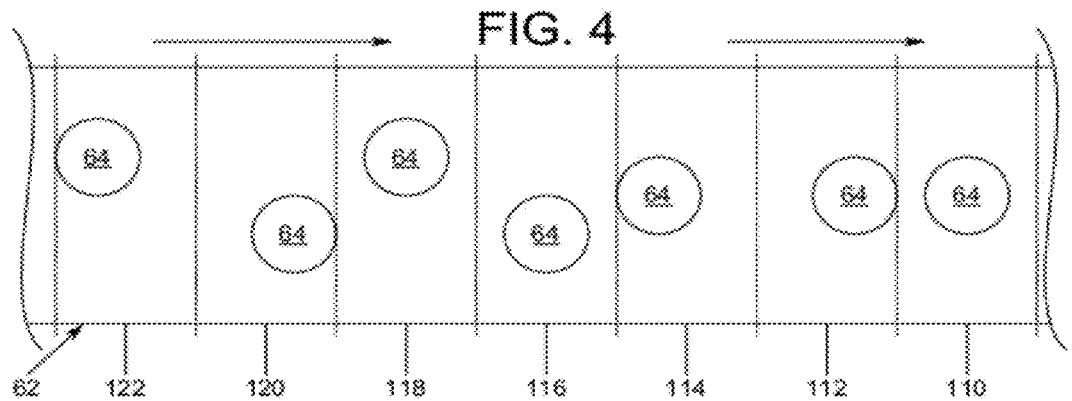
FIG. 4 is a schematic top plan view of a portion of the conveyor showing longitudinal and lateral locations of each of a plurality of glass containers in a corresponding plurality of longitudinal locations.

The analysis results in the location of the hot glass containers 64 on the conveyor 62 in seven consecutive longitudinal locations 110, 112, 114, 116, 118, 120, and 122 on the conveyor 62 that is shown in FIG. 4. Each glass container 64 has an ideal longitudinal location and an ideal lateral location on the conveyor 62. The ideal lateral position on the conveyor 62 is along a line extending laterally on the conveyor (it may or may not be on the centerline of the conveyor 62, depending upon the size of the glass container being manufactured), a location that is defined as Y=0, and the ideal longitudinal position on the conveyor 62 is related to the I.S. machine pulse and for each hot glass containers 64 is the desired longitudinal location on the conveyor 62 is defined as X=0.

The longitudinal offset of each hot glass containers 64 is determined by the image from the first camera module 66 (shown in FIG. 2) only, and the lateral offset of each hot glass containers 64 is determined by the image from both the first camera module 66 and the image from the second camera module (also shown in FIG. 2). The longitudinal and lateral offsets may then be used to modify the timing of the pushers that move the hot glass containers 64 from individual section deadplates adjacent to the conveyor 62 onto the conveyor 62 (all shown in FIG. 2). The timing of the operation of the pushers controls the longitudinal offset of the hot glass containers 64 on the conveyor 62, and the angular rotation of the mechanical pusher arms controls the lateral offset of the hot glass containers 64 on the conveyor 62.

The hot glass container 64 in the longitudinal location 110 is the only one of the seven hot glass containers 64 that is in the correct location, centered both longitudinally and laterally in the longitudinal location 110 (X=0, Y=0). The hot glass container 64 in the longitudinal location 112 is ahead of where it should be (X=+2, Y=0), the hot glass container 64 in the longitudinal location 114 is behind of where it should be (X=−2, Y=0), the hot glass container 64 in the longitudinal location 116 is across the centerline from where it should be (X=0, Y=+2), the hot glass container 64 in the longitudinal location 118 is behind the centerline from where it should be (X=0, Y=−2), the hot glass container 64 in the longitudinal location 120 is ahead of where it should be and across the centerline from where it should be (X=+2, Y=+2), and the hot glass container 64 in the longitudinal location 122 is behind of where it should be and behind the centerline from where it should be (X=−2, Y=−2).

Figure 5:
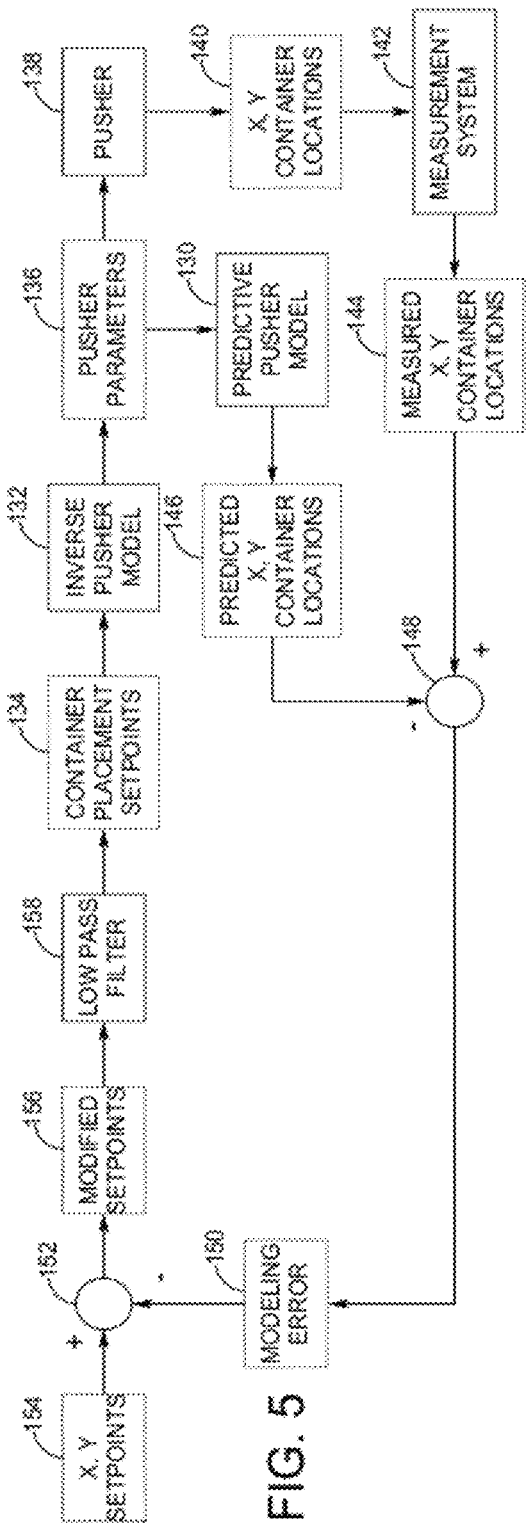
FIG. 5 is a functional schematic depiction of a first embodiment of the present invention which is an internal model-based control system utilizing both a predictive model and an inverse model.

To address the issues outlined above, the model based control system shown in FIG. 5 may be used. This system follows the Internal Model Control paradigm (as it is called in the Control System Literature), and utilizes both a predictive pusher model 130 and an inverse pusher model 132. The predictive pusher model 130 is used to compute the expected reaction of the placement of the glass containers to a change in the pusher parameters. The inverse pusher model 132 computes a set of pusher parameters which will provide an approximation of the desired glass container placements.

The closed loop control shown in FIG. 5 operates in the following manner. Container placement setpoints 134 are input to the inverse pusher model 132. The inverse pusher model 132 then computes a set of pusher parameters 136 that should approximately achieve the desired glass container placements. The pusher parameters 136 are then applied to the actual pusher 138. This results in the actual container placements 140 (specific X, Y glass container locations) on the conveyor.

The actual container placements 140 are provided by a container location measurement system 142, which provides as an output measured container placements 144 (measured X, Y glass container locations). The container location measurement system 142 is described in European Published Patent Application No. EP 2 336 740 A1, U.S. Patent Application Publication No. US 2011-0141264 A1, and U.S. Patent Application Publication No. US 2011/0141265 A1, all of which were incorporated by reference herein in their entirety. The pusher parameters 136 are also applied to the predictive pusher model 130, which computes predicted container placements 146 (predicted X, Y glass container locations) on the conveyor.

The predicted container placements 146 are subtracted from the measured container placements 144 by a summer 148, producing a modeling error signal 150. If the model of the process was perfect, the modeling error signal 150 would be zero. However, due to numerous actual factors which can not be perfectly taken into account, the modeling error signal 150 will generally be nonzero. To account for the modeling error signal 150, a summer 152 subtracts the modeling error signal 150 from a container placement setpoint 154, producing a modified setpoint 156. It will be understood, that if, due to the modeling error signal 150, the current value of the container placement setpoint 154 produces too great a response, the setpoint will then be modified accordingly to cause a smaller response, or vice versa.

To provide robustness against high frequency modeling errors, and to avoid reaction to spurious high frequency noise, the modified setpoint 156 is passed through a low pass filter 158, for example a rolling average value, producing the filtered, modified container placement setpoints 134, thus completing the control loop. For an overall control system, multiple loops, one per machine section, each with the same structure and operation as that described in FIG. 5 would be implemented.

A preferred embodiment of the system shown in FIG. 5, would utilize a linear, perturbation model of the push out process in which we have:

$$z = Pu \quad \text{Equation 1}$$

Where z is a vector of container placement position perturbations, P is a matrix of sensitivity coefficients, and u is a vector of pusher parameter adjustments. The matrix P could be determined empirically by performing a set of tests on an actual pusher, in which the input parameters, u are varied and the resulting perturbations z are recorded. Alternatively, if a sufficiently accurate simulation model were available, the "experiments" could be performed numerically using the simulation model to linearize the model. In either case, using regression techniques, the resulting data could be fit to an equation of the form of Equation 1. For a pusher with three cavities, u would be a six element vector giving the three x coordinates and three y coordinates of the containers on the conveyor.

The inverse pusher model 132 could then be obtained using the Moore-Penrose Pseudo Inverse (A generalized inverse for matrices, Roger Penrose, *Proceedings of the Cambridge Philosophical Society*, 51: 406-413, 1955) So that:

$$u = P^+ z \quad \text{Equation 2}$$

Where u is a vector of pusher parameter adjustments, z is a vector of container placement position perturbations, and $P^+$ is the Moore-Penrose Pseudo Inverse. The properties of the Moore-Penrose Pseudo Inverse are particularly suited to this application. If the number of available input adjustments (elements of the vector u) is less than the number of container placement coordinates, then in general it will not be possible to achieve an arbitrary set of container placement positions. The formulation in Equation 2 would provide the set of inputs u, which would provide an output z that is as close as possible (in a least square error sense) to the desired values. Alternatively, if there are more adjustable parameters then desired locations, then there are multiple possible solutions (values of u). In this case, the Moore-Penrose Pseudo inverse has the desirable property of providing the set of inputs u with the smallest magnitude.

Figure 6:
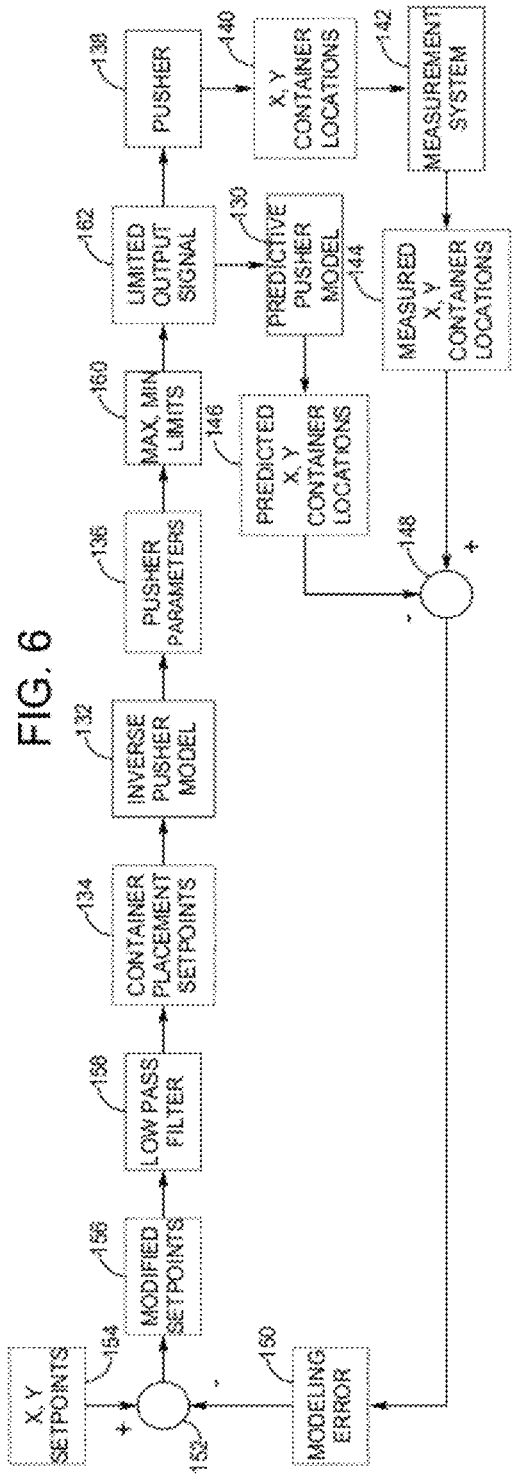
FIG. 6 is a functional schematic depiction of a second embodiment of the present invention which allows clipping of the pusher parameters adjustments.

In any practical implementation of the above approach, it will be recognized that the pusher parameter adjustments can not be arbitrarily large, and appropriate limits have to be applied. A simple approach to providing such limits is shown in FIG. 6, which is similar to the system of FIG. 5 and uses the same reference numerals, but which has two additional components. The pusher parameters 136 are supplied to a signal clipping block 160 having selected maximum and minimum limits. The signal clipping block 160 provides the necessary clipping of the signals if they exceed the allowed minimum or maximum values, to thereby produce a limited output signal 162, which is provided to the pusher 138 and to the predictive pusher model 130. Note that since the same limited output signal 162 is applied to both the pusher 138, and the predictive pusher model 130, the model "knows" that the input is clipped, and the clipping of the input signals does not result in creating any additional modeling error.

Figure 7:
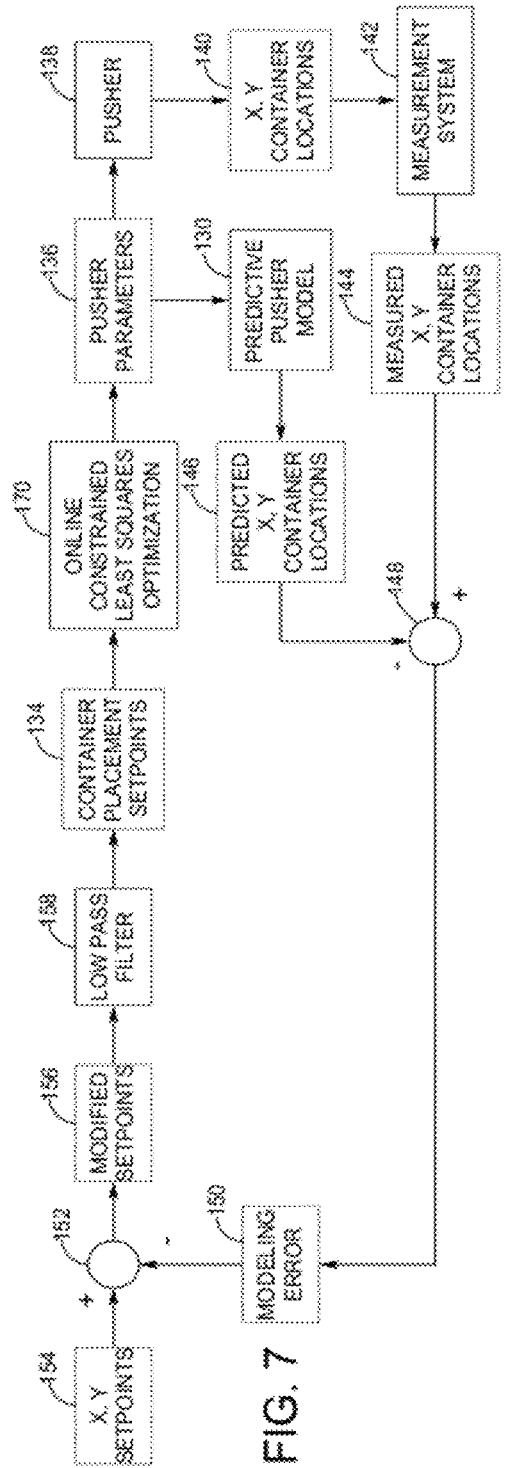
FIG. 7 is a functional schematic depiction of a third embodiment of the present invention which uses an alternate approach to applying limits to the pusher inputs.

Another alternative approach to applying limits to the pusher inputs is shown in FIG. 7, which is also similar to the system of FIG. 5 and uses the same reference numerals, but which replaces the inverse pusher model 132 of FIG. 5 with an alternative component. This approach is more computationally intensive, but will provide superior performance, and is therefore preferred if the control system hardware has the capability to provide the necessary computations in real time. In the approach shown in FIG. 7, the limits are taken into consideration directly, with an online constrained optimization being performed by an online constrained least squares optimizer 170 being used in place of the inverse pusher model 132 of FIG. 5 and its Moore-Penrose Pseudo Inverse. Specifically, a constrained, least squares optimization is performed online by the online constrained least squares optimizer 170 to solve the problem:

$$\text{minimize over } u, \text{magnitude}(z_{desired} - Pu)$$

$$\text{subject to: } u_{min} \leq u \leq u_{max} \qquad \text{Equation 3}$$

It should be noted that while the use of a linear model as previously described is advantageous in its relative simplicity, the approaches taught herein are not limited to the use of a linear model. Accordingly, more complex (and perhaps accurate) non-linear models could also be employed. In this case, the optimization performed in Equation 3 would take the more general form:

$$\text{minimize over } u, \text{magnitude}(z_{desired} - z(u))$$

$$\text{subject to: } u_{min} \leq u \leq u_{max} \qquad \text{Equation 4}$$

where z(u) is the non-linear functional relationship between the pusher adjustment u and the container locations z. A non-linear constrained optimization would then need to be performed. Dependable and fast solution algorithms are available that could potentially be applied practically in a real-time setting.

It is important to note one important special sub-problem of the overall closed loop container placement problem described to this point. This special sub-problem is that of just providing equal spacing (or other desired spacing) along the conveyor (x coordinate) for the groups of glass containers coming from each section. It can be seen that the placement of the group of glass containers from a given section (all the cavities from the section) can be moved along the conveyor simply by advancing or retarding the start of the container push event time.

If only this sectional spacing is to be corrected by the controller, then the control structure illustrated in FIG. 8 can be used. In this configuration, the measurement system 142 provides raw measurements 182 of the glass container longitudinal or X actual container locations 180 along the conveyor. A data analysis block 184 computes the centroid X location 186 of each group of containers corresponding to a given section. This is compared by a summer 188 to a desired X setpoint value 190 for the X spacing to produce a section spacing error signal 192. An inter-section spacing controller 194, which may be, for example, of the proportional-integral-derivative ("PID") type, computes an improved start of push event time (or start of push event angle 196 on a 360 degree timing drum) which is then applied to the pusher 138, with the pushout motion and timing 198 causing a pushout process 200 to occur, resulting in the actual container locations 180, thus completing the loop.

Figure 9:
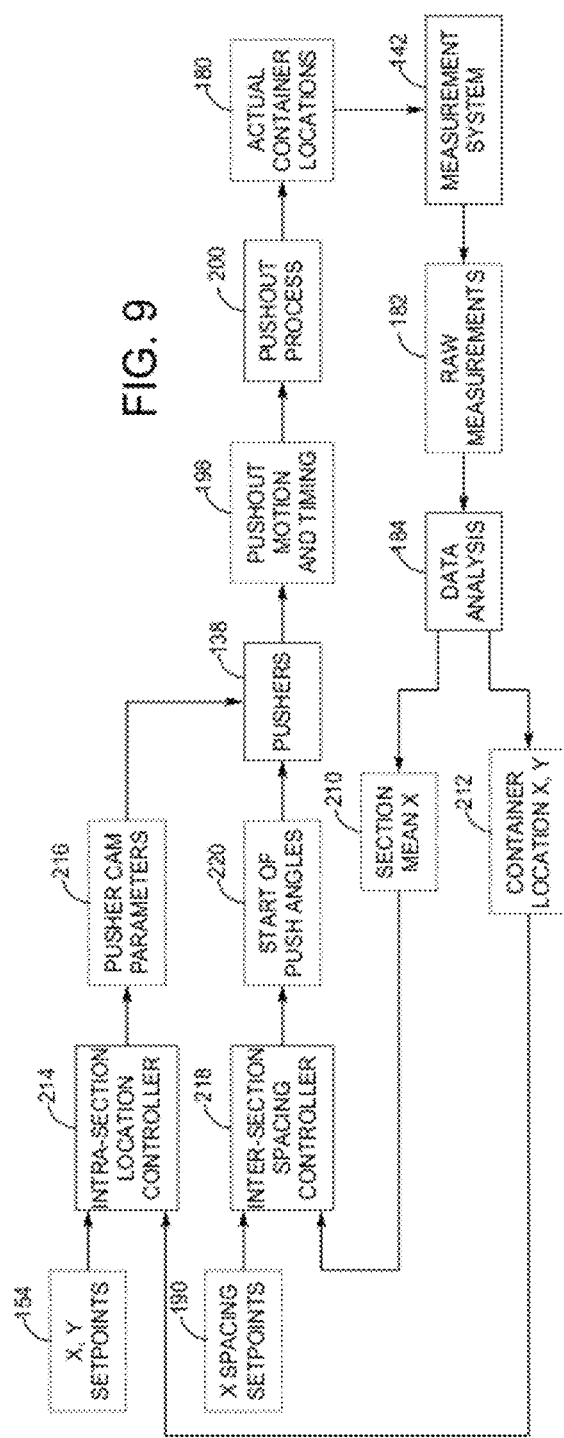
FIG. 9 is a functional schematic depiction of a fifth embodiment of the present invention which uses separate inter-section and intra-section controllers.

Given the availability of the relatively straightforward approach described above for adjusting the placement of the groups of glass containers from each section along the conveyor, it may be advantageous to make an overall control such as the one shown in FIG. 9. As shown therein, the data analysis block 184 computes both a section mean X location 210 of each group of containers from a section and actual container X and Y location information 212. The more complicated job of adjusting the x-y position within each section would be performed within an intra-section controller 214 with internal model controllers of the type shown in FIGS. 5 through 7, but would not include the start of push timing as an adjustable input. The container placement setpoint 154 and the actual container X and Y location information 212 are provided to the intra-section controller 214, which produces pusher cam parameters 216.

The start of push timing is controlled within an inter-section (spacing) controller 218, which may use the logic shown in FIG. 8. The desired X setpoint value 190 and the section mean X locations 210 are provided to the inter-section controller 218, which produces start of push angles 220. Both the pusher cam parameters 216 and the start of push angles 220 are provided to the pushers 138 to operate them. The balance of the system shown in FIG. 9 is identical to that shown in FIG. 8.

Finally, it is noted that with the model-based approach that has been described herein, it is important to have sufficiently accurate models of the process. If suitable, high fidelity simulation/analytical models are not available, necessary models may be built online as necessary. In this case, a system to automatically impose small perturbations to the various available inputs would be applied, and an automated computation would be performed to fit an empirical model to the resulting data. Such an approach could either be applied in a separate learning mode, for example when a new job is first started up, or while the process is operating normally. In the latter case, the perturbations would have to be limited to sufficiently small values to avoid upsetting the process.

Although the foregoing description of the closed loop conveyor control system of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A system for correctly placing glass containers formed by an I.S. machine onto a conveyor, comprising:
   a pusher mechanism for moving glass containers from a deadplate to the conveyor;

a glass container placement measurement system that provides a measured glass container placement signal indicative of the actual locations of glass containers moved onto the conveyer by the pusher mechanism;

apparatus for comparing the measured glass container placement signal with a desired glass container placement signal and generating a glass container placement error signal; and a control system using the glass container placement error signal to provide modified pusher parameters to vary the operation of the pusher mechanism in a manner that will cause the glass container placement error signal to be diminished;

wherein the desired glass container placement signal includes a desired glass container longitudinal placement signal and a desired glass container lateral placement signal, and wherein the measured glass container placement signal includes a measured glass container longitudinal placement signal and a measured glass container lateral placement signal, and wherein the control system comprises:

a first controller that uses the desired glass container longitudinal placement signal and the measured glass container longitudinal placement signal to provide modified longitudinal pusher parameters to vary the operation of the pusher mechanism in a manner that will cause the difference between the desired glass container longitudinal placement signal and the measured glass container longitudinal placement signal to be diminished; and a second controller that uses the desired glass container lateral placement signal and the measured glass container lateral placement signal to provide modified lateral pusher parameters to vary the operation of the pusher mechanism in a manner that will cause the difference between the desired glass container lateral placement signal and the measured glass container lateral placement signal to be diminished.

2. A system as defined in claim 1, wherein the pusher mechanism comprises a pusher arm and a finger assembly, wherein the pusher mechanism is arranged and configured to adjust the positions of glass containers moved from the deadplate to the conveyor by varying the timing of the operation of the pusher mechanism, the angular position of the pusher arm, and the angular position of the finger assembly with respect to the pusher arm as it places hot glass containers onto the conveyor.

3. A system as defined in claim 1, wherein the glass container placement measurement system is arranged and configured to monitor the radiation emitted by hot glass containers after they are formed and before they are cooled as they are conveyed from the I.S. machine on the conveyor.

4. A system as defined in claim 3, wherein the glass container placement measurement system comprises:

first and second imaging devices positioned after the I.S. machine on opposing sides of and at different angles with respect to the conveyor on which the hot glass containers are conveyed from the I.S. machine.

5. A system as defined in claim 1, wherein the glass container placement error signal is passed through a low pass filter prior to it being used by the control system.

6. A system as defined in claim 1, wherein the modified pusher parameters are supplied to a signal clipping block having preselected maximum and minimum limits to clip the modified pusher parameters if they exceed the allowed minimum or maximum values.

7. A system as defined in claim 1, additionally comprising:
a predictive pusher model module that computes an expected reaction of the placement of the glass containers to a change in the pusher parameters to provide a predicted glass container placement signal;

wherein the predicted glass container placement signal is subtracted from the measured glass container placement signal prior to the measured glass container placement signal being compared with the desired glass container placement signal to generate the glass container placement error signal.

8. A system as defined in claim 1, additionally comprising:
an inverse pusher model that computes the modified pusher parameters that will provide an approximation of the desired glass container placements.

9. A system for correctly placing glass containers formed by an I.S. machine onto a conveyor, comprising:

a pusher mechanism for moving glass containers from a deadplate to the conveyor;

a glass container placement measurement system that provides a measured glass container placement signal indicative of the actual locations of glass containers moved onto the conveyer by the pusher mechanism;

apparatus for comparing the measured glass container placement signal with a desired glass container placement signal and generating a glass container placement error signal; and a control system using the glass container placement error signal to provide modified pusher parameters to vary the operation of the pusher mechanism in a manner that will cause the glass container placement error signal to be diminished;

additionally comprising:
an online constrained least squares optimizer that solves the problem:

minimize over $u$, magnitude($z_{desired} - Pu$)

subject to: $u_{min} \leq u \leq u_{max}$ (where z is a vector of container placement position perturbations, P is a matrix of sensitivity coefficients, and u is a vector of pusher parameter adjustments) to compute the modified pusher parameters that will provide an approximation of the desired glass container placements.

10. A system for correctly placing glass containers formed by an I.S. machine onto a conveyor, comprising:

a pusher mechanism for moving glass containers from a deadplate to the conveyor;

a glass container placement measurement system that provides a measured glass container placement signal indicative of the actual locations of glass containers moved onto the conveyer by the pusher mechanism;

apparatus for comparing the measured glass container placement signal with a desired glass container placement signal and generating a glass container placement error signal; and a control system using the glass container placement error signal to provide modified pusher parameters to vary the operation of the pusher mechanism in a manner that will cause the glass container placement error signal to be diminished additionally comprising:
an online constrained least squares optimizer that solves the problem:

minimize over $u$, magnitude($z_{desired} - z(u)$)

subject to: $u_{min} \leq u \leq u_{max}$ (where z is a vector of container placement position perturbations, z(u) is the non-linear functional relationship between the pusher adjustment u and the container locations z, and u is a vector of pusher parameter adjustments) to compute the modified pusher parameters that will provide an approximation of the desired glass container placements.

11. A system as defined in claim 1, wherein the second controller also uses the desired glass container longitudinal placement signal and the measured glass container longitudinal placement signal to provide modified longitudinal pusher parameters to vary the operation of the pusher mechanism in a manner that will cause the difference between the desired glass container longitudinal placement signal and the measured glass container longitudinal placement signal to be further diminished.

12. A system as defined in claim 1, additionally comprising:
a data analysis block that generates the measured glass container longitudinal placement signal and the measured glass container lateral placement signal from the measured glass container placement signal.

13. A method of correctly placing glass containers formed by an I.S. machine onto a conveyor with a pusher mechanism, comprising:
providing a measured glass container placement signal indicative of the actual locations of glass containers moved onto the conveyor by the pusher mechanism;
providing a desired glass container placement signal;
comparing the measured glass container placement signal with a desired glass container placement signal and generating a glass container placement error signal; and
using the glass container placement error signal to provide modified pusher parameters to vary the operation of the pusher mechanism in a manner that will cause the glass container placement error signal to be diminished; and
additionally comprising:
computing the modified pusher parameters that will provide an approximation of the desired glass container placements with an inverse pusher model.

14. A method as defined in claim 13, wherein the pusher mechanism comprises a pusher arm and a finger assembly, wherein the operation of the pusher mechanism is operated to adjust the positions of glass containers moved from the deadplate to the conveyor by varying the timing of the operation of the pusher mechanism, the angular position of the pusher arm, and the angular position of the finger assembly with respect to the pusher arm as it places hot glass containers onto the conveyor.

15. A method as defined in claim 13, wherein the providing the measured glass container placement signal step comprises:
monitoring the radiation emitted by hot glass containers after they are formed and before they are cooled as they are conveyed from the I.S. machine on the conveyor.

16. A method as defined in claim 15, wherein the monitoring step comprises:
positioning first and second imaging devices after the I.S. machine on opposing sides of and at different angles with respect to the conveyor on which the hot glass containers are conveyed from the I.S. machine.

17. A method as defined in claim 13, additionally comprising:
passing the glass container placement error signal through a low pass filter prior to the using step.

18. A method as defined in claim 13, additionally comprising:
supplying the modified pusher parameters to a signal clipping block having preselected maximum and minimum limits to clip the modified pusher parameters if they exceed the allowed minimum or maximum values.

19. A method as defined in claim 13, additionally comprising:
computing an expected reaction of the placement of the glass containers to a change in the pusher parameters to provide a predicted glass container placement signal; and
subtracting the predicted glass container placement signal from the measured glass container placement signal prior to the measured glass container placement signal being compared with the desired glass container placement signal to generate the glass container placement error signal.

20. A method of correctly placing glass containers formed by an I.S. machine onto a conveyor with a pusher mechanism, comprising:
providing a measure glass container placement signal indicative of the actual locations of glass containers moved onto the conveyor by the pusher mechanism;
providing a desired glass container placement signal;
comparing the measured glass container placement signal with a desired glass container placement signal and generating a glass container placement error signal;
using the glass container placement error signal to provide modified pusher parameters to vary the operation of the pusher mechanism in a manner that will cause the glass container placement error signal to be diminished; and
additionally comprising:
computing the modified pusher parameters that will provide an approximation of the desired glass container placements with an online constrained least squares optimizer that solves the problem:

$$\text{minimize over } u, \text{magnitude}(z_{desired} - Pu)$$

$$\text{subject to: } u_{min} \leq u \leq u_{max}$$

(where z is a vector of container placement position perturbations, P is a matrix of sensitivity coefficients, and u is a vector of pusher parameter adjustments) to compute the modified pusher parameters that will provide an approximation of the desired glass container placements.

21. A method of correctly placing glass containers formed by an I.S. machine onto a conveyor with a pusher mechanism, comprising:
providing a measured glass container placement signal indicative of the actual locations of glass containers moved onto the conveyor by the pusher mechanism;
providing a desired glass container placement signal;
comparing the measured glass container placement signal with a desired glass container placement signal and generating a glass container placement error signal;
using the glass container placement error signal to provide modified pusher parameters to vary the operation of the pusher mechanism in a manner that will cause the glass container placement error signal to be diminished; and
additionally comprising:
computing the modified pusher parameters that will provide an approximation of the desired glass container placements with an online constrained least squares optimizer that solves the problem:

$$\text{minimize over } u, \text{magnitude}(z_{desired} - z(u))$$

$$\text{subject to: } u_{min} \leq u \leq u_{max}$$

(where z is a vector of container placement position perturbations, z(u) is the non-linear functional relationship between the pusher adjustment u and the container locations z, and u is a vector of pusher parameter adjustments) to compute the modified pusher parameters that will provide an approximation of the desired glass container placements.

22. A method of correctly placing glass containers formed by an I.S. machine onto a conveyor with a pusher mechanism, comprising:
- providing a measured glass container placement signal indicative of the actual locations of glass containers moved onto the conveyer by the pusher mechanism;
- providing a desired glass container placement signal;
- comparing the measured glass container placement signal with a desired glass container placement signal and generating a glass container placement error signal;
- using the glass container placement error signal to provide modified pusher parameters to vary the operation of the pusher mechanism in a manner that will cause the glass container placement error signal to be diminished; and
- wherein the desired glass container placement signal includes a desired glass container longitudinal placement signal and a desired glass container lateral placement signal, and wherein the measured glass container placement signal includes a measured glass container longitudinal placement signal and a measured glass container lateral placement signal, and wherein the using step comprises:
- using the desired glass container longitudinal placement signal and the measured glass container longitudinal placement signal to provide modified longitudinal pusher parameters to vary the operation of the pusher mechanism in a manner that will cause the difference between the desired glass container longitudinal placement signal and the measured glass container longitudinal placement signal to be diminished; and
- uses the desired glass container lateral placement signal and the measured glass container lateral placement signal to provide modified lateral pusher parameters to vary the operation of the pusher mechanism in a manner that will cause the difference between the desired glass container lateral placement signal and the measured glass container lateral placement signal to be diminished.

23. A method as defined in claim 22, additionally comprising:
- generating the measured glass container longitudinal placement signal and the measured glass container lateral placement signal from the measured glass container placement signal.

* * * * *